(12) United States Patent
Bai et al.

(10) Patent No.: US 12,395,943 B2
(45) Date of Patent: Aug. 19, 2025

(54) ANTENNA SELF-CAPACITANCE CHANGE DETECTION METHOD AND APPARATUS, AND RELATED APPLICATIONS

(71) Applicant: Shenzhen CVA Innovation Co., Ltd, Shenzhen (CN)

(72) Inventors: Songrong Bai, Shenzhen (CN); Shuo Fan, Shenzhen (CN); Jie Wang, Shenzhen (CN)

(73) Assignee: Shenzhen CVA Innovation Co., Ltd, Shenzhen (CN)

( * ) Notice: Subject to any disclaimer, the term of this patent is extended or adjusted under 35 U.S.C. 154(b) by 355 days.

(21) Appl. No.: 18/134,299

(22) Filed: Apr. 13, 2023

(65) Prior Publication Data

US 2024/0349200 A1 Oct. 17, 2024

(51) Int. Cl.
  *H04W 52/28* (2009.01)
  *G01V 3/08* (2006.01)

(52) U.S. Cl.
  CPC .......... *H04W 52/283* (2013.01); *G01V 3/088* (2013.01)

(58) Field of Classification Search
  CPC .............................. H04W 52/283; G01V 3/088
  See application file for complete search history.

(56) References Cited

U.S. PATENT DOCUMENTS

| | | | |
|---|---|---|---|
| 8,432,322 B2 | 4/2013 | Amm et al. | |
| 9,582,111 B2 | 2/2017 | Rouaissia et al. | |
| 2012/0071203 A1* | 3/2012 | Wong | H04M 1/724 455/550.1 |
| 2014/0035871 A1* | 2/2014 | Karpin | G06F 3/0446 345/174 |

(Continued)

FOREIGN PATENT DOCUMENTS

| | | |
|---|---|---|
| CN | 110244134 A | 9/2019 |
| CN | 111491051 B | 5/2021 |

(Continued)

OTHER PUBLICATIONS

Huttunen, Arttu et al., Capacitive Sensing of Antenna Loading With an R-C Voltage Divider in a Tunable Antenna, IEEE, Feb. 2013, IEEE Sensors Journal vol. 13 No. 2, pp. 849-853 (Year: 2013).*

*Primary Examiner* — Lewis G West
(74) *Attorney, Agent, or Firm* — Dorsey & Whitney LLP

(57) ABSTRACT

The disclosure relates to an antenna self-capacitance change detection method and apparatus, and related applications. The method includes: acquiring a total self-capacitance change of the antenna and a total self-capacitance change of the sensor electrode respectively; determining a first self-capacitance change of the antenna caused by a temperature change according to the total self-capacitance change of the sensor electrode and a preset self-capacitance change proportional coefficient; and determining a difference value between the total self-capacitance change and the first self-capacitance change of the antenna as a second self-capacitance change of the antenna caused by proximity of an object. The antenna self-capacitance change detection method can accurately determine the antenna self-capacitance change caused by the proximity of the object, to accurately determine whether there is an object approaching, thereby better controlling and adjusting the antenna transmitting power.

20 Claims, 14 Drawing Sheets

(56) References Cited

U.S. PATENT DOCUMENTS

| | | | | |
|---|---|---|---|---|
| 2015/0002446 | A1* | 1/2015 | Ayzenberg | G06F 3/0446 |
| | | | | 345/174 |
| 2015/0044977 | A1* | 2/2015 | Ramasamy | H01Q 1/44 |
| | | | | 455/77 |
| 2016/0124574 | A1* | 5/2016 | Rouaissia | H01Q 1/243 |
| | | | | 345/174 |
| 2016/0370487 | A1* | 12/2016 | Komulainen | H04W 52/283 |
| 2017/0018841 | A1* | 1/2017 | Parkhurst | H01Q 9/0421 |
| 2017/0249032 | A1* | 8/2017 | Konopka | G06F 3/0418 |
| 2018/0026364 | A1* | 1/2018 | Chou | H01Q 3/24 |
| | | | | 343/757 |
| 2018/0088633 | A1* | 3/2018 | Whitman | G06F 1/1677 |
| 2018/0306603 | A1* | 10/2018 | Ballam | G01R 27/2605 |
| 2019/0140701 | A1* | 5/2019 | Greason | G06K 7/10336 |
| 2020/0241663 | A1* | 7/2020 | Kao | H04B 5/72 |
| 2020/0300900 | A1* | 9/2020 | Bolender | G06F 3/044 |
| 2021/0377384 | A1* | 12/2021 | Alameh | H04M 1/72454 |
| 2022/0300111 | A1* | 9/2022 | Yellepeddi | G06F 3/044 |
| 2022/0334672 | A1* | 10/2022 | Rouaissia | G06F 3/0418 |
| 2023/0025551 | A1* | 1/2023 | Ramasamy | H04W 52/146 |
| 2023/0216497 | A1* | 7/2023 | Rouaissia | H03K 17/955 |
| | | | | 324/663 |
| 2023/0236668 | A1* | 7/2023 | Glad | H01Q 1/526 |
| | | | | 345/174 |
| 2024/0349200 | A1* | 10/2024 | Bai | G01V 3/088 |

FOREIGN PATENT DOCUMENTS

| | | |
|---|---|---|
| EP | 3293953 A1 | 3/2018 |
| JP | 2014515093 A | 6/2014 |

\* cited by examiner

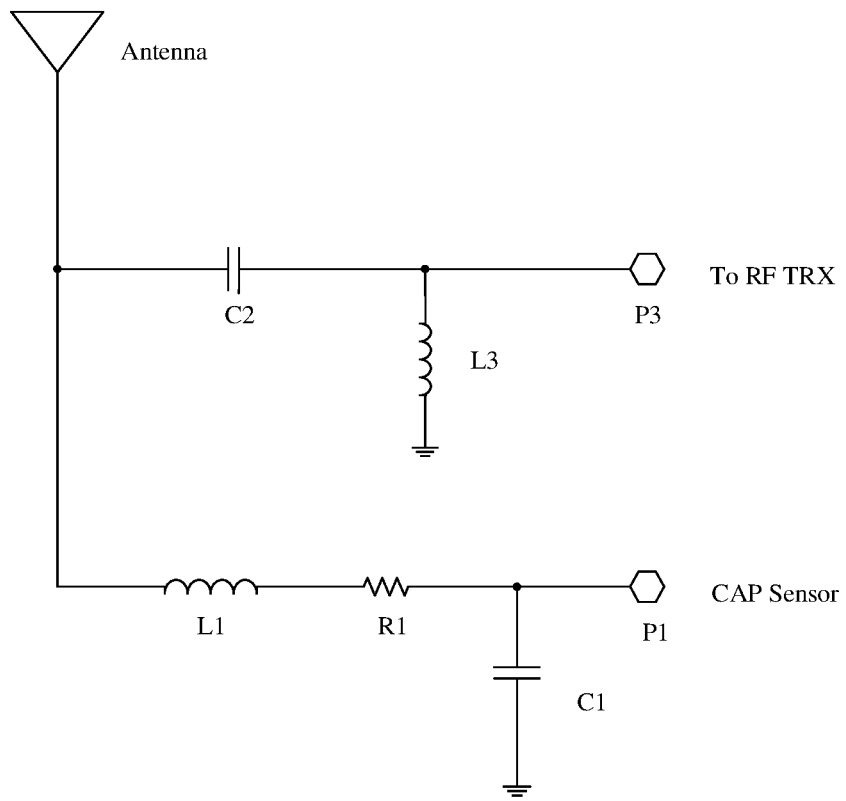

FIG. 8 total self-capacitance changes of the antenna 1 and the sensor electrode 2 are acquired respectively — S21 the first self-capacitance change of the antenna 1 caused by the temperature change is determined according to the total self-capacitance change of the sensor electrode 2 and the preset self-capacitance change proportional coefficient — S22 whether there is an object approaching the antenna 1 is determined based on the difference value between the total self-capacitance change and the first self-capacitance change of the antenna 1 — S23

FIG. 9

ANTENNA SELF-CAPACITANCE CHANGE DETECTION METHOD AND APPARATUS, AND RELATED APPLICATIONS

TECHNICAL FIELD

The present disclosure relates to the field of capacitive detection technology, and particularly to an antenna self-capacitance change detection method and apparatus, and related applications.

BACKGROUND

The Specific Absorption Rate (SAR) is the basic limit for measuring the electromagnetic radiation of the radio device. During the use of the radio device, especially when approached by human bodies, the SAR needs to be reduced to an appropriate level such that the radio device conforms to the SAR standards, in order to reduce the effects of radiation on the human body.

The mobile communication device is taken as an example, it is possible to detect the self-capacitance change of the antenna in the mobile communication device by multiplexing antennas to determine whether there is a human body approaching, and the principle thereof is shown in FIG. 1. When a human body approaches the antenna, the self-capacitance of the antenna may change. When a human body is determined to approach the antenna according to the self-capacitance change, the transmitting power of the antenna can be appropriately reduced to reduce the electromagnetic radiation, such that the mobile communication device conforms to the SAR limit.

SUMMARY

An embodiment of the present disclosure provides an antenna module including: an antenna configured to generate a self-capacitance change based on an approaching object and a temperature change; and at least one sensor electrode configured to generate a self-capacitance change based on the temperature change. The sensor electrode is configured to locate in a region in which the sensor electrode is electromagnetically shielded by the antenna in at least one direction, such that no electromagnetic field is formed between the sensor electrode and the approaching object in the at least one direction when a voltage difference between the antenna and the sensor electrode remains constant.

Optionally, the sensor electrode includes at least one of a metal sheet, a metal wire, a conductive non-metallic sheet, or a conductive non-metallic wire.

Optionally, the antenna and the sensor electrode are configured to locate in the same temperature environment.

A further embodiment of the present disclosure provides a proximity detection system including the above-mentioned antenna module and a detection circuit. The detection circuit is configured to: detect a total self-capacitance change of the sensor electrode; detect a total self-capacitance change of the antenna; and determine a self-capacitance change of the antenna caused by proximity of an object based on the total self-capacitance change of the sensor electrode and the total self-capacitance change of the antenna.

Optionally, the detection circuit is further configured to determine whether there is an object approaching based on the self-capacitance change of the antenna caused by the proximity of the object.

Optionally, the detection circuit is configured to determine a self-capacitance change of the antenna caused by a temperature change according to the total self-capacitance change of the sensor electrode and a preset self-capacitance change proportional coefficient, and determine the self-capacitance change of the antenna caused by the proximity of the object based on the self-capacitance change of the antenna caused by the temperature change and the total self-capacitance change of the antenna.

Optionally, the preset self-capacitance change proportional coefficient is determined according to an area of the antenna.

Optionally, the detection circuit includes: a sensor electrode self-capacitance detection circuit and an antenna self-capacitance detection circuit.

The sensor electrode self-capacitance detection circuit is configured to detect the total self-capacitance change of the sensor electrode, and includes a first low-frequency filter path and a first self-capacitance detection path. The first low-frequency filter path is configured to connect the sensor electrode and the first self-capacitance detection path to block a high-frequency signal and allow a low-frequency signal to pass therethrough. The first self-capacitance detection circuit is configured to detect an output voltage of the first low-frequency filter path, to obtain the total self-capacitance change of the sensor electrode.

The antenna self-capacitance detection circuit is configured to detect the total self-capacitance change of the antenna, and includes a second low-frequency filter path, a high-frequency filter path, and a second self-capacitance detection path. The second low-frequency filter path is configured to connect the antenna and the second self-capacitance detection path to block the high-frequency signal and allow the low-frequency signal to pass therethrough. The high-frequency filter path is configured to connect the antenna and a RF transceiver unit to block the low-frequency signal and allow the high-frequency signal to pass therethrough. The second self-capacitance detection circuit is configured to detect an output voltage of the second low-frequency filter path, to obtain the total self-capacitance change of the antenna.

Optionally, the detection circuit is configured to: acquire a plurality of difference values between the total self-capacitance change and the first self-capacitance change of the antenna at a plurality of times within a preset time period; perform fitting according to the plurality of different values, and obtain a fitting curve; and compare the fitting curve to a plurality of preset reference fitting curves, each reference fitting curve corresponding to one object identifier, and determine an object identifier corresponding to a matched reference fitting curve as the approaching object when the fitting curve matches one of the reference fitting curves.

Optionally, the detection circuit is further configured to: determine a reference distance corresponding to a difference value between the total self-capacitance change and the first self-capacitance change of the antenna at a current time according to a preset mapping relationship between the difference value and a distance; determine a target mean square error according to the fitting curve; determine a target variation of capacitance reading corresponding to the target mean square error according to a preset mapping relationship between the mean square error and a variation of capacitance reading; and determine a target approaching distance according to the reference distance and the target variation of capacitance reading.

A further embodiment of the present disclosure provides an antenna transmitting power control system including the above-mentioned proximity detection system. The detection circuit is configured to adjust a transmitting power of the antenna according to a preset rule when an object is detected to approach the antenna.

A further embodiment of the present disclosure further provides a radio device including the above-mentioned proximity detection system, and including a housing. The antenna module is located inside the housing and the sensor electrode is located inside the antenna.

A further embodiment of the present disclosure provides an antenna self-capacitance change detection method for an antenna module including an antenna and a sensor electrode. The sensor electrode is configured to be electromagnetically shielded by the antenna in at least one direction such that no electromagnetic field is formed between the sensor electrode and the approaching object in the at least one direction. The method includes: acquiring a total self-capacitance change of the antenna and a total self-capacitance change of the sensor electrode respectively; determining a first self-capacitance change of the antenna caused by a temperature change according to the total self-capacitance change of the sensor electrode and a preset self-capacitance change proportional coefficient; and determining a difference value between the total self-capacitance change and the first self-capacitance change of the antenna as a second self-capacitance change of the antenna caused by proximity of an object.

Optionally, the preset self-capacitance change proportional coefficient is determined according to an area of the antenna and an area of the sensor electrode, the first self-capacitance change of the antenna caused by the temperature change is equal to the product of the total self-capacitance change of the sensor electrode and the preset self-capacitance change proportional coefficient.

Optionally, the antenna self-capacitance change detection method further includes: determining whether there is an object approaching the antenna based on the second self-capacitance change.

Optionally, the acquiring the total self-capacitance change of the antenna and the total self-capacitance change of the sensor electrode respectively includes: acquiring total self-capacitance changes of the antenna and total self-capacitance changes of the sensor electrode at a plurality of times. The determining the first self-capacitance change of the antenna caused by the temperature change according to the total self-capacitance change of the sensor electrode and the preset self-capacitance change proportional coefficient includes: determining a plurality of first self-capacitance changes of the antenna caused by the temperature change at a plurality of times according to a plurality of total self-capacitance changes of the sensor electrode and the preset self-capacitance change proportional coefficient. The determining the difference value between the total self-capacitance change and the first self-capacitance change of the antenna as the second self-capacitance change of the antenna caused by the proximity of the object includes: determining a plurality of difference values at a plurality of times.

The antenna self-capacitance change detection method further includes: performing fitting according to the plurality of different values, and obtaining a fitting curve; and comparing the fitting curve to a plurality of preset reference fitting curves, each reference fitting curve corresponding to one object identifier, and determining an object identifier corresponding to a matched reference fitting curve as the approaching object when the fitting curve matches one of the reference fitting curves.

Optionally, the antenna self-capacitance change detection method further includes: determining a reference distance corresponding to a difference value between the total self-capacitance change and the first self-capacitance change of the antenna at a current time according to a preset mapping relationship between the difference value and a distance; determining a target mean square error according to the fitting curve; determining a target variation of capacitance reading corresponding to the target mean square error according to a preset mapping relationship between the mean square error and a variation of capacitance reading; and determining a target approaching distance according to the reference distance and the target variation of capacitance reading.

Optionally, the antenna and the sensor electrode are configured to locate at the same ambient temperature.

A further embodiment of the present disclosure provides an antenna transmitting power control method including the above-mentioned antenna self-capacitance change detection method. When an object is detected to approach the antenna, the antenna transmitting power is adjusted according to a preset rule.

A further embodiment of the present disclosure provides a computer storage medium, on which computer executable instructions are stored. When the computer executable instructions are executed by a processor, the above-mentioned antenna self-capacitance change detection method is implemented.

Other features and advantages of the present disclosure will be detailed in subsequent description and, in part, will become obvious from the specification or through the embodiments of the disclosure. The purposes and other advantages of the disclosure can be implemented and obtained by means of the specification, claims, and the structure specifically indicated in the accompanying drawings.

The technical solution of the present disclosure will be further detailed through the accompanying drawings and embodiments.

BRIEF DESCRIPTION OF THE DRAWINGS

The accompanying drawings are intended to provide further understanding of the present disclosure, form part of the specification, and are used in conjunction with embodiments of the disclosure to explain the present disclosure, rather than constituting a limitation to the present disclosure. In the accompanying drawings:

FIG. 8 is an example diagram of a filter path according to the embodiment II of the present disclosure.

FIG. 9 is a flow chart showing a proximity detection method according to an embodiment III of the present disclosure.

DETAILED DESCRIPTION OF THE EMBODIMENTS

The exemplary embodiments of the disclosure are described in more detail below with reference to the accompanying drawings. Although the exemplary embodiments of the disclosure are shown in the accompanying drawings, it should be appreciated that the present disclosure can be implemented in various forms and should not be limited by the embodiments set forth here. Rather, these embodiments are provided to enable a more thorough understanding of the disclosure and to enable complete communication of the scope of the disclosure to those skilled in the art.

In the description of the present disclosure, it should be noted that orientations or position relationships indicated by the terms "center", "up", "down", "left", "right", "vertical", "horizontal", "inside", "outside", etc., are based on the orientations or position relationships shown in the accompanying drawings, and are only for the purpose of facilitating the description of the disclosure and simplifying the description, rather than indicating or implying that the device or element referred to definitely have a particular orientation, be constructed and operated in a particular orientation, and therefore cannot be construed as a limitation to the present disclosure. Furthermore, the terms "first", "second", and "third" are used for descriptive purposes only and cannot be understood to indicate or imply relative importance.

In the description of the present disclosure, it is important to note that, unless otherwise expressly specified and qualified, the terms "installation", "connection" and "coupling" shall be understood broadly, for example, it may be a fixed connection, a detachable connection or an integrated connection; it may be a mechanical connection, or an electrical connection; it can be a direct connection, or an indirect connection through an intermediation; it can be a communication within two components. Those skilled in the art can understand the specific meaning of the above terms in the disclosure according to specific circumstances.

Since the antenna used in the mobile communication device is very sensitive to the temperature and may also cause a very large change in the self-capacitance when the temperature changes. As a result, when the approach detection is performed by means of the self-capacitance, it is impossible to distinguish whether the change in the self-capacitance is caused by the change in the temperature or the change in the self-capacitance caused by the proximity of objects. Therefore, the accuracy of the existing human body proximity detection based on the antenna self-capacitance change is lower.

In order to solve the technical problem that the object proximity detection based on the antenna self-capacitance change has lower accuracy, the present disclosure in embodiments provides an antenna module and a proximity detection method applied to the antenna module, and related applications.

Embodiment I

Figure 1:
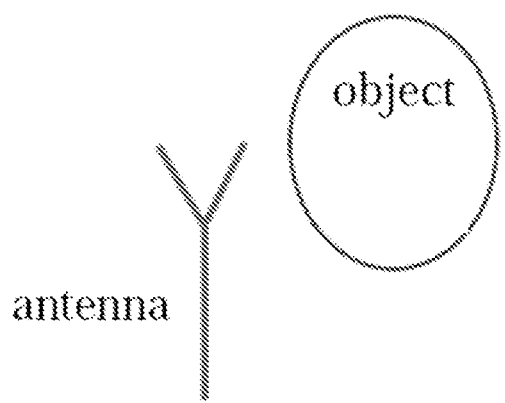
FIG. 1 is a schematic diagram illustrating a principle of an antenna proximity detection in the prior art.
Figure 2:
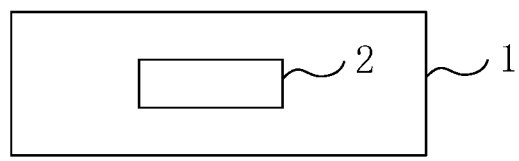
FIG. 2 is a schematic structure diagram of an antenna module according to an embodiment I of the present disclosure.

The embodiment I of the present disclosure provides an antenna module with a structure shown in FIG. 2, which includes an antenna 1 and at least one sensor electrode 2. The sensor electrode 2 is located in a region in which the sensor electrode is electromagnetically shielded by the antenna 1 in at least one direction. When an external human body approaches the antenna 1, the antenna 1 can block electric field lines between the external human body and the sensor electrode 2. For example, the antenna 1 can block the electric field lines above a preset percentage between the external human body and the sensor electrode 2. The preset percentage can be set in advance or be a system default. The preset percentage ranges from 0 to 1. For example, the preset percentage can be 70%, 75%, 80%, 85%, 90%, or 95%, etc., which is not limited here. Optionally, the antenna 1, for example, can completely or nearly completely block the electric field lines between the external human body and the sensing electrode 2. When the antenna 1 is able to block the electric field lines of any percentage within a preset range between the external human body and the sensor electrode 2, the antenna 1 is regarded as being approximate to completely block the electric field lines between the external human body and the sensor electrode 2. The preset range can be set in advance or be a system default, for example, the preset range is [90%, 100%).

In the following description of the present disclosure, the illustration is focused on that the antenna 1 can completely or nearly completely block the electric field lines between the external human body and the sensor electrode 2 as an example.

Figure 3:
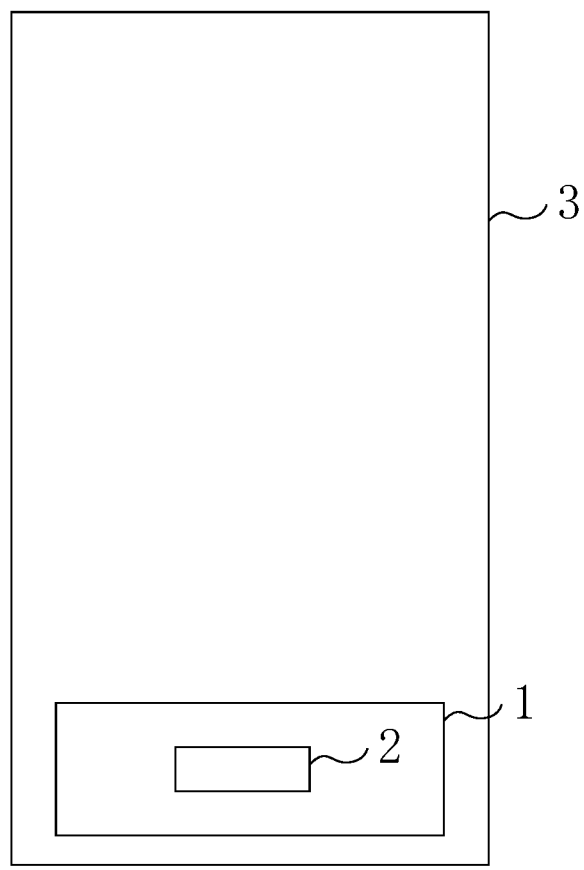
FIG. 3 is a schematic structure diagram of a radio device provided with the antenna module according to the embodiment I of the present disclosure.

In a practice application, the sensor electrode 2 may be located on a side of the antenna 1, or inside the antenna 1 if the antenna 1 and the sensor electrode 2 are mounted in a radio device. As shown in FIG. 3, the antenna 1 is located inside (or in a lower portion of) a housing 3 of the radio device, and the sensor electrode 2 is located inside (or in a lower portion of) the antenna 1. An outer side of the antenna 1 is away from the sensor electrode 2. When the human body approaches the outer side of the antenna 1, the antenna 1 can block the electric field lines between the sensor electrode 2 and the human body.

The region in which the sensor electrode is electromagnetically shielded by the antenna 1 in at least one direction refers to a region where no electromagnetic field is formed between the sensor electrode 2 and an approaching object in at least one direction when a voltage difference between the antenna 1 and sensor electrode 2 is kept constant during the measurement of the self-capacitance of the sensor electrode 2. The radio device is taken as an example, the antenna 1 in the radio device is generally mounted on an inner side of housing, and there exists an electromagnetic shielding layer between the antenna 1 and a component, such as an internal chip of the radio device; and then the sensor electrode 2 is mounted between the antenna 1 and the electromagnetic shielding layer.

It should be noted that it is necessary for low frequency signals to keep the voltage difference between the antenna 1 and the sensor electrode 2 constant. There exists a high-frequency signal and a low-frequency signal on the antenna 1. The high-frequency signal is configured to perform a related function of the antenna 1, while the low-frequency signal is configured to sense the capacitance. As for the sensing of the capacitive sensing by the low-frequency signal, the high-frequency signal needs to be filtered out through the filter path. Accordingly, as for the lower-frequency signal, the voltage difference between the sensor electrode 2 and the antenna 1 is kept constant, and then there is no change in the amount of charge between the sensor electrode 2 and the antenna 1. As a result, the change in the electrical signal on the antenna 1 does not affect the sensor electrode 2. The voltage difference between the antenna 1 and the sensor electrode 2 can be preset or system default. For example, the voltage difference can include but is not limited to 0V, 0.5V, or 1V, etc., which is not limited here.

In order to achieve a better electromagnetic shielding effect, and make the self-capacitance change of the sensor electrode 2 not affected by the external approaching object, the area of the sensor electrode 2 may be much smaller than the area of the antenna 1, and a distance between the sensor electrode 2 and the antenna 1 may be small enough to be much smaller than a distance between the approaching object and the antenna 1. In such a manner, when the area of the antenna 1 is large enough and the area of the sensor electrode 2 is small enough, it can be determined that the sensor electrode 2 forms the electric field shielding due to the blocking of the antenna 1, and there is no or substantially no electric field line between the sensor electrode 2 and the approaching object. The self-capacitance of the sensor electrode 2 is not affected by the approaching object but is mainly or only affected by the change in the ambient temperature, while the self-capacitance of the antenna 1 is affected by both the change in the ambient temperature and the external approaching object.

However, it can be understood that the above related technical problems can be addressed to some extent when the sensor electrode 2 is provided in at least one direction of the antenna 1, regardless of the distance and the area-size relationship between the antenna 1 and the sensor electrode 2, as long as the antenna 1 can at least partially block the electric field lines between the approaching object and the sensor electrode 2. Therefore, any technical solution that solves the relevant technical problem by providing the sensor electrode 2 in at least one direction of the antenna 1 shall fall within the scope of protection of the present disclosure.

The sensor electrode 2 in the above antenna module can be a metal sheet or wire. Optionally, the material of the sensor electrode 2 is the same as that of the antenna 1. The sensor electrode 2 can be selected from an existing metal sheet or wire in the radio device, or can be a newly added metal sheet or wire. Optionally, the materials of the sensor electrode 2 and the antenna 1 are not limited to metallic conductive materials, but can also be other appropriate non-metallic conductive materials, including but not limited to graphene, such as conductive non-metallic sheets or conductive non-metallic wires.

In some embodiments, the distance between the sensor electrode 2 and the antenna 1 is set according to the size of the sensor electrode 2, the size of the antenna 1, and an estimated size of the approaching object. The distance here refers to a vertical distance between the sensor electrode 2 and the antenna 1, which can be measured as a minimum distance between the sensor electrode 2 and the antenna 1, or as an average value of the distances between the sensor electrode 2 and the antenna 1 at multiple selected positions. The estimated size can be preset or system default.

Optionally, a projection of a center of a coverage region of the sensor electrode 2 overlaps with a projection of a center of a coverage region of the antenna 1 on the housing of the device, or a distance between the projection of the center of the coverage region of the sensor electrode 2 and the projection of the center of the coverage region of the antenna 1 on the housing of the device is not greater than a set distance threshold. The distance threshold can be, for example, set according to experience, which is not limited here. The centers of the coverage regions of the sensor electrode 2 and the antenna 1 can be determined according to respective shapes. The center of the coverage region here may refer to a center of a projection region on the housing of the radio device, in which the housing of the radio device is taken as a reference.

A ratio of the coverage region of the sensor electrode 2 to the coverage region of the antenna 1 is determined according to the coverage region of the antenna and the estimated coverage region of the approaching object. The coverage region here may refer to a projection region on the housing of the radio device, in which the housing of the radio device is taken as a reference. A range of the ratio may satisfy a requirement that a coverage area of the sensor electrode 2 is much smaller than a coverage area of the antenna 1.

Figure 4:
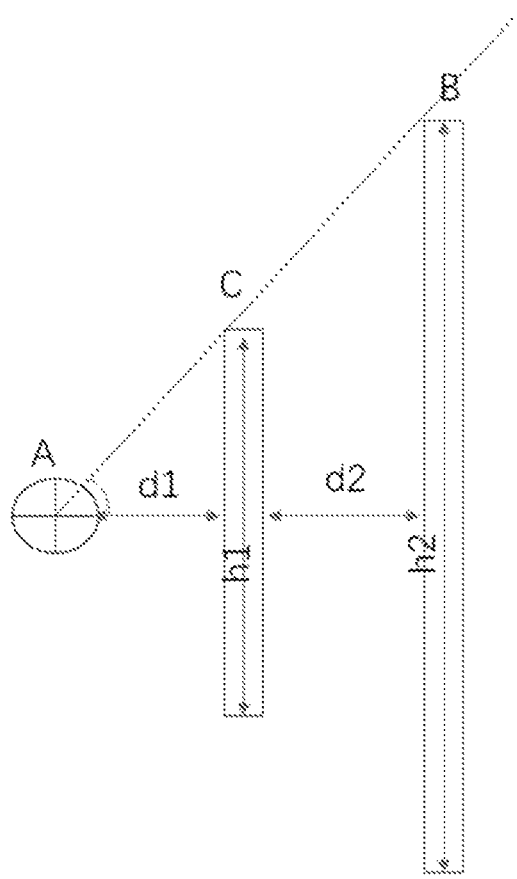
FIG. 4 is a schematic diagram illustrating a principle of an antenna self-capacitance change detection according to an embodiment II of the present disclosure.

Optionally, in some embodiments, referring to FIG. 4, A represents the sensor electrode 2, B represents the approaching object, and C represents the antenna 1. Assume that a width of a narrower side of the antenna 1 is h1, and a width of a side of the antenna 1 approaching an object is h2. In an actual situation, h2 is generally much greater than h1, that is, $h2 > N*h1$, $N > 1$. In order to better shield the electric field between the antenna 1 and the sensor electrode 2, a proportional relationship between the distance d1 from the sensor electrode 2 to antenna 1 and the distance d2 from the antenna 1 to the approaching object is $d1/d2 < h1/h2$, or $d1/(d1+d2) < h1/h2$. The distances d1 and d2 refer to vertical distances between two objects, which can be measured as a minimum distance between the two objects, or as an average value of the distances between the two objects at multiple selected positions.

Optionally, d1/d2 can be preset or a system default. For example, d1/d2 is equal to 1/10.

Optionally, the vertical distance between the antenna 1 and the sensor electrode 2 is equal to 0.12 mm. Further optionally, the vertical distance between the antenna 1 and the sensor electrode 2 can be in a range of 0.08 mm to 0.2 mm, such as 0.1 mm, 0.15 mm, 0.18 mm, etc., without limitation here.

It should be noted that, in general, the minimum distance d2 between the antenna 1 and the approaching object can be, for example, a vertical distance between the antenna 1 and the outer surface of the electronic device away from the antenna 1. When the approaching object is in contact with the outer surface of the electronic device, the approaching object and the sensor electrode 2 are respectively located on opposite sides of the outer surface.

In practical applications, the sensor electrode 2 and the antenna 1 can be respectively mounted in the radio device, and fixed by a board card, housing, etc. Alternatively, the sensor electrode 2 and the antenna 1 can also be fixed together and then mounted in the radio device through one of them. When the sensor electrode 2 and the antenna 1 are fixed together, they can be fixed and connected through an insulating material. However, the fixing manner of the sensor electrode 2 and the antenna 1 is not limited in the present disclosure, which can also be limited by other appropriate manner.

Based on the same inventive conception, the embodiment I of the present disclosure further provides a method for manufacturing an antenna module, including: at least one sensor electrode 2 is provided in a region in which the sensor electrode 2 is electromagnetically shielded by an antenna 1 in at least one direction, such that the antenna 1 and the sensor electrode 2 are in the same or substantially the same temperature environment.

Optionally, the sensor electrode is fixed to the antenna by using an insulating material.

In the antenna module provided in the embodiment I of the disclosure, the sensor electrode 2 is provided in the region in which the sensor electrode 2 is electromagnetically shielded by the antenna 1 in at least one direction, since the sensor electrode 2 is adjacent to the antenna 1, the effect of the change in the ambient temperature on the sensor electrode 2 and the antennal is substantially the same, accordingly the self-capacitance change of the antenna 1 caused by the change in the temperature can be eliminated by a difference between the self-capacitance changes of the sensor electrode 2 and the antenna 1, and the self-capacitance change of the antenna 1 caused by proximity of an object can be accurately obtained, so that whether there is an object approaching can be accurately determined.

Embodiment II

Figure 5:
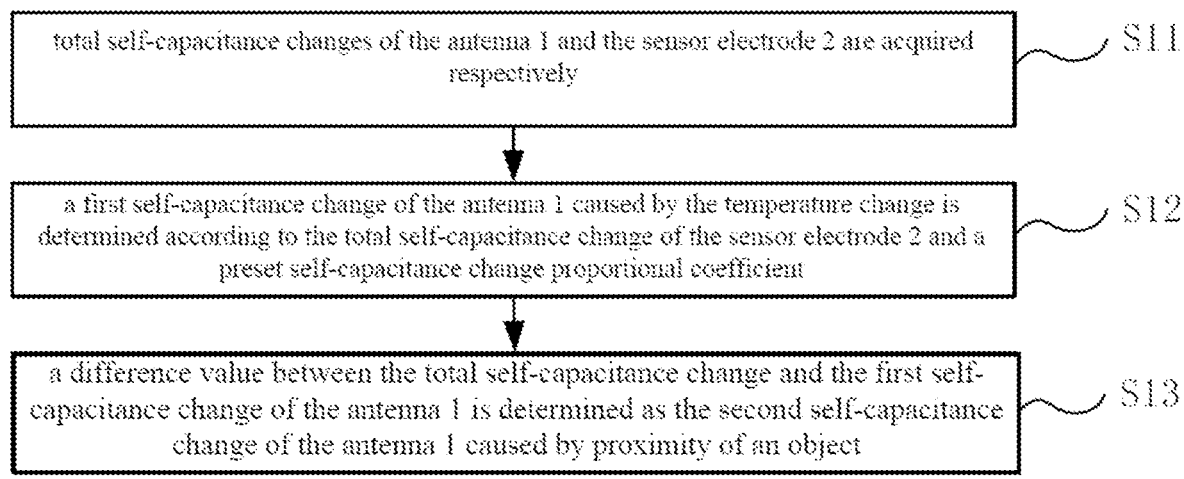
FIG. 5 is a flow chart showing an antenna self-capacitance change detection method according to the embodiment II of the present disclosure.

The embodiment II of the present disclosure provides a self-capacitance change detection method for the antenna 1, which can be applied to the antenna module provided in the embodiment I. The process of the method is shown in FIG. 5, and includes the following steps.

S11: total self-capacitance changes of the antenna 1 and the sensor electrode 2 are acquired respectively.

Optionally, the total self-capacitance change of the antenna 1 is, for example, but not limited to, a total self-capacitance change of the antenna 1 at current time with respect to reference time.

Optionally, the total self-capacitance change of the sensor electrode 2 is, for example, but not limited to, a total self-capacitance change of the sensor electrode 2 at current time relative to reference time.

Since the sensor electrode 2 is electromagnetically shielded by the antenna 1, the self-capacitance change of the sensor electrode 2 can be determined as unaffected by external approaching objects. The principle is shown in FIG. 4, A represents the shielded sensor electrode 2, C represents the antenna 1 serving as a shield, and B represents the ground or an approaching object. When the distance between A and C is small enough to be much less than the distance between A and B, and when C is large enough and A is small enough, it is determined that there is no electric field line between A and B, thereby implementing the electromagnetic shielding, and the self-capacitance changes of A and B can be measured respectively.

In the step, initial self-capacitances of the antenna 1 and the sensor electrode 2 at the reference time can be acquired respectively, and current self-capacitances of the antenna 1 and the sensor electrode 2 at the current time can be acquired respectively. The total self-capacitance change of the antenna 1 is determined according to the initial self-capacitance and current self-capacitance of the antenna 1; and the total self-capacitance change of the sensor electrode 2 is determined according to the initial self-capacitance and current self-capacitance of the sensor electrode 2.

Optionally, the initial self-capacitances of the antenna 1 and the sensor electrode 2 at the reference time are, for example, the initial self-capacitances at the power-on time.

Optionally, the self-capacitance of the antenna 1 can be detected by a first self-capacitance detection electrode on the capacitance detection chip connected to the antenna 1; and the self-capacitance of the sensor electrode 2 can be detected by a second self-capacitance detection electrode on the capacitance detection chip connected to the sensor electrode 2.

S12: a first self-capacitance change of the antenna 1 caused by the temperature change is determined according to the total self-capacitance change of the sensor electrode 2 and a preset self-capacitance change proportional coefficient.

In an optional embodiment, the first self-capacitance change of the antenna 1 caused by the temperature change is equal to the total self-capacitance change of the sensor electrode 2 times the self-capacitance change proportional coefficient, or equal to a ratio of the total self-capacitance change of the sensor electrode 2 to the self-capacitance change proportional coefficient.

Since the area sizes of the sensor electrode 2 and the antenna 1 are different (the area of the sensor electrode 2 should be much smaller than that of the antenna 1), the self-capacitance Cr of the sensor electrode 2 needs to be multiplied by a coefficient A to obtain the self-capacitance Ca of the antenna. Moreover, when the sensor electrode 2 and the antenna 1 are made of the same material and adjacent to each other, the self-capacitance changes thereof with the temperature are consistent, that is, there exists a proportional relationship between the self-capacitance change $\Delta C_{a,t}$ of the antenna 1 caused by the temperature change $\Delta t$ and the self-capacitance change $\Delta C_{r,t}$ of the sensor electrode 2 caused by the temperature change $\Delta t$, i.e., $$\frac{\Delta C_{a,t}}{\Delta C_{r,t}} \approx A.$$

When the self-capacitance change of the sensor electrode 2 is measured, the self-capacitance change $\Delta C_{a,t}$ of the antenna 1 caused by the temperature change $\Delta t$ can be determined based on this proportional relationship.

Optionally, the coefficient A is preset, for example, during the product design, and is pre-stored in a memory. In addition, the product can also measure the self-capacitances of the antenna 1 and the sensor electrode 2 during the power-on, and store the proportional coefficient A therebetween in the memory for later calculation by a processor. Of course, the determination of the proportional coefficient A in the disclosure is not limited to the above two implementation manners, but may also be determined by other appropriate manners.

S13: a difference value between the total self-capacitance change and the first self-capacitance change of the antenna 1 is determined as the second self-capacitance change of the antenna 1 caused by proximity of an object.

After the first self-capacitance change of the antenna 1 caused by the temperature change is determined, the first self-capacitance change $\Delta C_{a,t}$ caused by the temperature change is subtracted from the total detected self-capacitance change $\Delta C_a$ of the antenna 1, and then the second self-capacitance change of the antenna 1 caused by the proximity of the object is obtained. Further, an approaching degree of the object can be determined based on the value of the second self-capacitance change. For example, the greater the second self-capacitance change, the closer the object is; or, the smaller the second self-capacitance change, the farther the object is.

Figure 6:
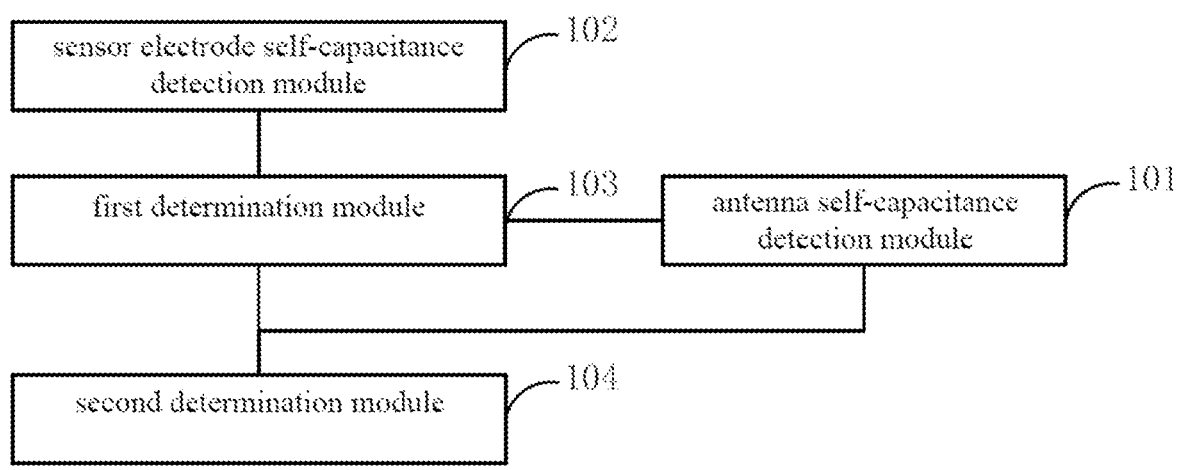
FIG. 6 is a schematic structure diagram illustrating an antenna self-capacitance change detection apparatus according to the embodiment II of the present disclosure.
Figure 7:
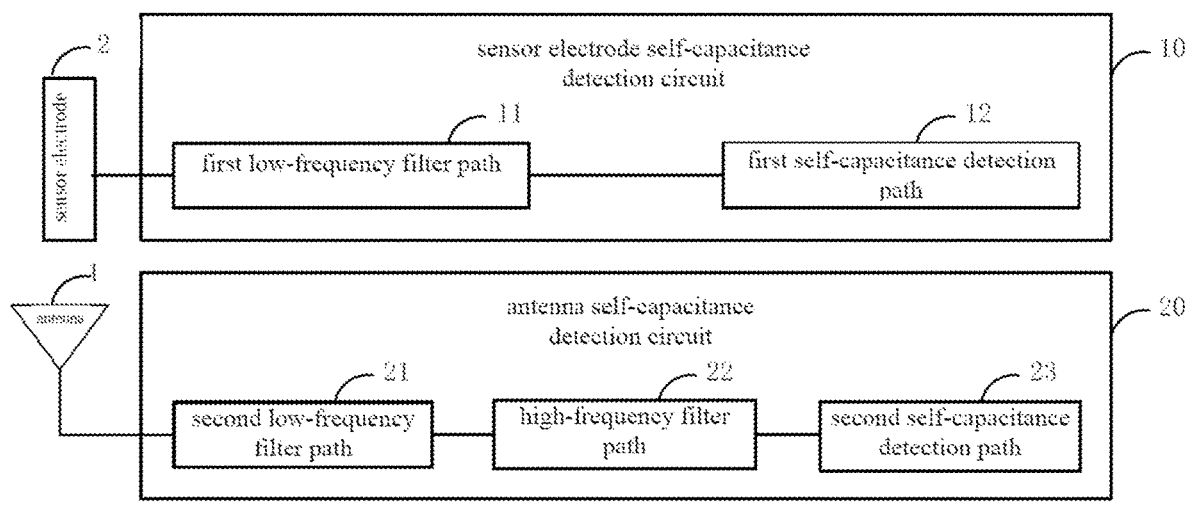
FIG. 7 is a schematic structure diagram illustrating a capacitance detection chip according to the embodiment II of the present disclosure.

Based on the same inventive concept, the embodiment II of the present disclosure further provides an antenna self-capacitance change detection apparatus, which can be applied to the antenna module provided in the embodiment I, and a structure thereof is shown in FIG. 6. The apparatus includes the following components.

An antenna self-capacitance detection module 101 is configured to obtain the total self-capacitance change of the antenna 1.

Optionally, for example but not limited, the antenna self-capacitance detection module 101 is configured to acquire the total self-capacitance change of the antenna 1 at the current time with respect to the reference time.

A sensor electrode self-capacitance detection module 102 is configured to acquire the total self-capacitance change of the sensor electrode 2.

Optionally, the sensor electrode self-capacitance detection module 102 is configured to acquire the total self-capacitance change of the sensor electrode 2 at the current time with respect to the reference time.

A first determination module 103 is configured to determine the first self-capacitance change of the antenna 1 caused by the temperature change according to the total self-capacitance change of the sensor electrode 2 and the proportional coefficient A.

A second determination module 104 is configured to determine the difference value between the total self-capacitance change and the first self-capacitance change of the antenna 1 as the second self-capacitance change of the antenna 1 caused by the proximity of the object.

The proportional coefficient A is a proportional coefficient between the self-capacitance of the antenna 1 and the self-capacitance of the sensor electrode 2.

As for the antenna self-capacitance change detection apparatus in the above embodiment, the specific operation mode of each module is described in detail in the embodiment of the method and will not be elaborated here.

An embodiment of the present disclosure further provides an antenna self-capacitance change detection system, including the antenna module described in the embodiment I above and the antenna self-capacitance change detection apparatus described in the embodiment II above.

An embodiment of the present disclosure further provides an antenna self-capacitance change detection system, including the antenna module described in the above embodiment and a detection circuit; the detection circuit includes:

a sensor electrode self-capacitance detection circuit 10 and an antenna self-capacitance detection circuit 20.

The sensor electrode self-capacitance detection circuit 10 includes a first low-frequency filter path 11 and a first self-capacitance detection path 12.

The first low-frequency filter path 11 is configured to connect the sensor electrode 2 in the antenna module and the first self-capacitance detection path 12, to block an high-frequency signal and allow a low-frequency signal to pass therethrough.

The first self-capacitance detection circuit 12 is configured to detect an output voltage of the first low-frequency filter path 11 and obtain the total self-capacitance change of the sensor electrode 2.

The antenna self-capacitance detection circuit 20 includes a second low-frequency filter path 21, a high-frequency filter path 22, and a second self-capacitance detection path 23.

The second low-frequency filter path 21 is configured to connect the antenna 1 in the antenna module and the second self-capacitance detection path 23, to block the high-frequency signal and allow the low-frequency signal to pass therethrough.

The high-frequency filter path 22 is configured to connect the antenna 1 in the antenna module and a radio frequency (RF) transceiver unit, to block the low-frequency signal and allow the high-frequency signal to pass therethrough.

The second self-capacitance detection circuit 23 is configured to detect an output voltage of the second low-frequency filter path 21 and obtain the total self-capacitance change of the antenna 1.

A specific structure of the filter path in the antenna self-capacitance detection circuit 20 is shown in FIG. 8. The antenna is connected to two filter paths; the upper high-frequency filter path includes a capacitor C2 and an inductor L3. C2 is connected to the antenna and L3 is grounded. The low-frequency signal is filtered out while the high-frequency signal is allowed to pass through. An output terminal P3 is connected to the RF transceiver unit (RF TRX); the lower low-frequency filter path includes the inductor L1, a resistor R1 and the capacitor C1. L1 is connected to the antenna, and C1 is grounded. The high-frequency signal is filtered out while the low-frequency signal is allowed to pass through. The output terminal P1 is connected to the self-capacitance detection circuit, for example, a capacitive proximity (CAP) sensor.

In an embodiment, the sensor electrode self-capacitance detection circuit 10 and the antenna self-capacitance detection circuit 20 are integrated in the capacitance detection chip.

Understandably, the detection circuit may further include a processor for performing calculations, such that the detection circuit may be configured to determine the self-capacitance change of the antenna caused by the proximity of the object based on the total self-capacitance change of the antenna and the total self-capacitance change of the sensor electrode.

With the antenna self-capacitance change detection method and apparatus, proximity detection method and apparatus provided by the embodiments of the present disclosure, the self-capacitance change of the antenna 1 caused by the temperature change can be determined by using the self-capacitance change of the sensor electrode 2, and the self-capacitance change of the antenna 1 caused by the temperature change is subtracted from the total self-capacitance change of the antenna 1, the self-capacitance change of the antenna 1 caused by the proximity of the object can be accurately obtained, so that whether there is an object approaching can be accurately determined.

Embodiment III

The embodiment III of the present disclosure provides a proximity detection method that can be applied to the antenna module provided in the embodiment I. The process of the method is shown in FIG. 9, and includes the following steps.

S21: total self-capacitance changes of the antenna 1 and the sensor electrode 2 are acquired respectively.

Optionally, the total self-capacitance changes of the antenna 1 and the sensor electrode 2 at the current time relative to the reference time are acquired respectively. Reference can be made to the relevant description in the embodiment II.

S22: the first self-capacitance change of the antenna 1 caused by the temperature change is determined according to the total self-capacitance change of the sensor electrode 2 and the preset self-capacitance change proportional coefficient A. Reference can be made to the relevant description in the embodiment II.

S23: whether there is an object approaching the antenna 1 is determined based on the difference value between the total self-capacitance change and the first self-capacitance change of the antenna 1.

After the first self-capacitance change of the antenna 1 caused by the temperature change is determined, the first self-capacitance change $\Delta C_{a,t}$ caused by the temperature change is subtracted from the total detected self-capacitance change $\Delta C_a$ of the antenna 1, and then the second self-capacitance change of the antenna 1 caused by the proximity of the object is obtained, i.e., the difference value between the total detected self-capacitance change and the first self-capacitance change of the antenna 1; and it can be determined whether there is an object approaching the antenna 1 based on the difference value. For example, when the different value is greater than a preset threshold, it is determined that there is an object approaching the antenna, or when the difference value is within a preset threshold range, it is determined that there is an object approaching. Optionally, it can also be further determined whether it is a human body approaching or other objects approaching. For example, when the difference value is within a first threshold range, it is determined that there is a human body approaching; and when the difference value is within a second threshold range, it is determined that there is an object approaching.

Optionally, the step that whether there is an object approaching the antenna 1 is determined based on the difference value between the total self-capacitance change and the first self-capacitance change of the antenna 1 may include the following steps.

A1: a difference value between the total self-capacitance change and the first self-capacitance change of the antenna 1 within a preset time period is acquired, and a plurality of difference values are obtained.

A2: fitting is performed according to the plurality of different values, and a fitting curve is obtained.

A3: the fitting curve is compared to reference fitting curves in a set of preset curves; the set of preset curves includes a plurality of reference fitting curves, and each reference fitting curve corresponds to one object identifier.

A4: when the fitting curve is successfully matched with a target reference fitting curve, an object identifier corresponding to the target reference fitting curve is determined as the approaching object; the target reference fitting curve is a reference fitting curve in the set of preset curves.

The preset time period can be set in advance or system default. The set of preset curves can be pre-stored in the memory. The set of preset curves may include a plurality of reference fitting curves, and each reference fitting curve corresponds to one object identifier. The object identifier is configured to identify a type of the object. For example, the object identifier may include at lease of people, cat, dog, book, cell phone, wallet, wood, etc., which are not limited here. Of course, people can also be men or women. A horizontal axis of the reference fitting curve represents the time, and a vertical axis represents the difference values.

Specifically, the difference value between the total self-capacitance change and the first self-capacitance change of the antenna 1 in a preset time period can be acquired, and a plurality of difference values are obtained; each difference value corresponds to a time point. Furthermore, a plurality of coordinate points can be constructed based on the plurality of difference values and the plurality of time points, and then the fitting is performed based on the plurality of coordinate points to obtain the fitting curve. Further, the fitting curve can be compared to the reference fitting curves in the set of preset curves. When the fitting curve is successfully matched with the target reference fitting curve, the object identifier corresponding to the target reference fitting curve is determined as the approaching object. In such a manner, not only the proximity detection can be performed, but also the type of the approaching object can be detected.

Optionally, the method may further include the following steps.

B1: a reference distance corresponding to a difference value between the total self-capacitance change and the first self-capacitance change of the antenna 1 at the current time is determined according to a preset mapping relationship between the difference value and a distance.

B2: a target mean square error is determined according to the fitting curve.

B3: a target variation of capacitance reading corresponding to the target mean square error is determined according to a preset mapping relationship between the mean square error and a variation of capacitance reading.

B4: a target approaching distance is determined according to the reference distance and the target variation of capacitance reading.

In the specific implementation, the preset mapping relationship between the difference value and the distance, and the preset mapping relationship between the mean square error and the variation of capacitance reading can be pre-stored. A value of the variation of capacitance reading can be ranged from −0.1 to 0.1. Due to the variation, there exists a certain error in the distance. In addition, the variation of capacitance reading can be utilized to correct the reference distance to improve the accuracy of the distance detection.

Specifically, the reference distance corresponding to the difference value between the total self-capacitance change and the first self-capacitance change of the antenna 1 at the current time can be determined according to the preset mapping relationship between the difference value and the distance; and then sampling is performed according to the fitting curve to obtain a plurality of points, and the target mean square error is determined according to the plurality of points; and then the target variation of capacitance reading corresponding to the target mean square error is determined according to the preset mapping relationship between the mean square error and the variation of capacitance reading; and then the target approaching distance is determined according to the reference distance and the target variation of capacitance reading; specifically, as follows:

target approaching distance=(1+target variation of capacitance reading)*reference distance In such a manner, the distance of the approaching object can be accurately detected.

Figure 10:
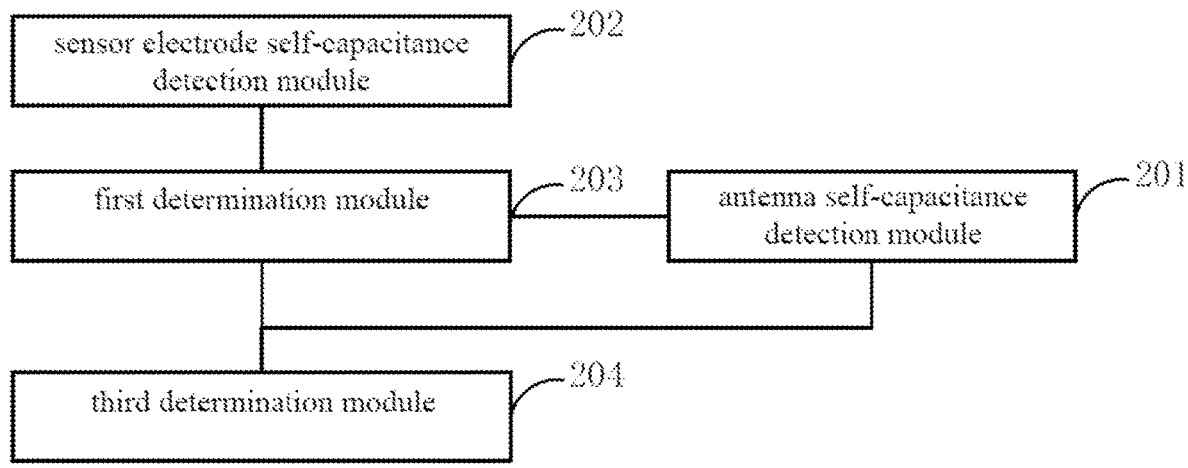
FIG. 10 is a schematic structure diagram illustrating a proximity detection apparatus according to an embodiment III of the present disclosure.

Based on the same inventive concept, the embodiment III of the present disclosure further provides a proximity detection apparatus, that can be applied to the antenna module provided in the embodiment I; a structure thereof is shown in FIG. 10 and includes the following components.

An antenna self-capacitance detection module 201 is configured to acquire the total self-capacitance change of the antenna 1.

Optionally, the antenna self-capacitance detection module 201 is configured to acquire the total self-capacitance change of the antenna 1.

A sensor electrode self-capacitance detection module 202 is configured to acquire the total self-capacitance change of the sensor electrode 2.

Optionally, the sensor electrode self-capacitance detection module 202 is configured to acquire the total self-capacitance change of the sensor electrode 2 at the current time with respect to the reference time.

A first determination module 203 is configured to determine the first self-capacitance change of the antenna 1 caused by the temperature change according to the total self-capacitance change of the sensor electrode 2 and the preset self-capacitance proportional coefficient A.

A third determination module 204 is configured to determine whether there is an object approaching the antenna 1 according to the difference value between the total self-capacitance change of and the first self-capacitance change of the antenna 1.

With respect to the proximity detection apparatus in the above embodiment, the specific manner in which each module performs operations is described in detail in the embodiment of the method and will not be elaborated here.

An embodiment of the present disclosure further provides an approach detection system including the antenna module described in the above embodiment I and the proximity detection apparatus described in the above embodiment III.

With the proximity detection method provided in the embodiment of the disclosure, the self-capacitance change of the antenna caused by the temperature change can be determined by using the self-capacitance change of the sensor electrode 2, the self-capacitance change of the antenna 1 caused by the temperature change is subtracted from the total self-capacitance change of the antenna 1, and the self-capacitance change of the antenna 1 caused by the proximity of the object can be accurately obtained, in order to accurately determine whether is an object approaching.

Embodiment IV

Figure 11:
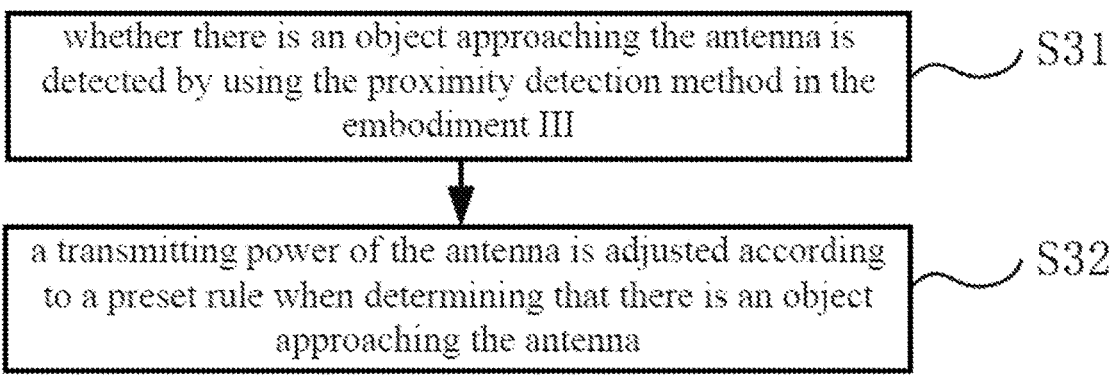
FIG. 11 is a flow chart showing an antenna transmitting power control method according to an embodiment IV according to the present disclosure.

The embodiment IV of the present disclosure provides an antenna transmitting power control method, which can be applied to the antenna module provided in the embodiment I. The process of the method is shown in FIG. 11, and includes the following steps.

S31: whether there is an object approaching the antenna is detected by using the proximity detection method in the embodiment III.

S32: a transmitting power of the antenna is adjusted according to a preset rule when determining that there is an object approaching the antenna.

In the step, an adjustment amount of the transmitting power of the antenna 1 is determined according to the difference value between the total self-capacitance change and the first self-capacitance change of the antenna 1; and the transmitting power of the antenna 1 is adjusted based on the determined adjustment amount. The specific adjustment amount can be set according to the requirements. For example, an optional manner is that the larger the difference value, the smaller the distance between the object and the antenna 1, and the more the transmitting power of the antenna 1 needs to be reduced. Optionally, when there is an object approaching the antenna 1, the transmitting power of the antenna 1 may be adjusted to a specified value.

Figure 12:
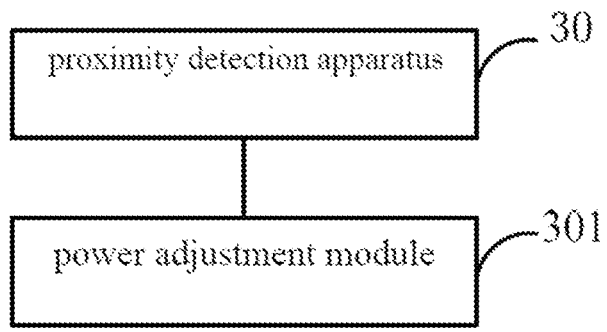
FIG. 12 is a schematic structure diagram illustrating an antenna transmitting power control apparatus according to the embodiment IV of the present disclosure.

Based on the same inventive concept, the embodiment IV of the present disclosure further provides an antenna transmitting power control apparatus, which can be applied to the antenna module provided in the embodiment I, and a structure thereof is shown in FIG. 12; the apparatus includes: the proximity detection apparatus 30 provided in the embodiment III, and a power adjustment module 301.

The power adjustment module 301 is configured to adjust the transmitting power of the antenna 1 according to the preset rule when the proximity detection apparatus 30 detects an object approaching the antenna 1.

As for the antenna transmitting power control apparatus in the above embodiment, the specific manner of operation of each module is described in detail in the embodiment of the method and will not be elaborated here.

An embodiment of the present disclosure further provides an antenna transmitting power control system, which includes the antenna module described in the above embodiment I and the antenna transmitting power control apparatus described in the above embodiment IV.

In the antenna transmitting power control method provided in the embodiment of the present disclosure, the self-capacitance change of the antenna caused by the temperature change can be determined by using the self-capacitance change of the sensor electrode 2; the self-capacitance change of the antenna 1 caused by the temperature change is subtracted from the total self-capacitance change of the antenna 1, and the self-capacitance change of the antenna 1 caused by the proximity of the object and be accurately obtained, thereby accurately determining whether there is an object approaching, to better control the transmission power of the antenna 1 and reduce the impact of the electromagnetic radiation on the human body, such that the radio device can satisfy the SAR standard.

Embodiment V

Figure 13:
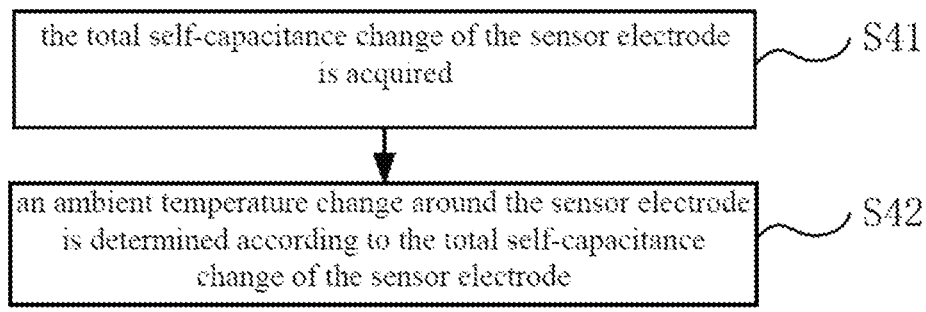
FIG. 13 is a flow chart showing a temperature detection method according to an embodiment V of the present disclosure.

The embodiment V of the present disclosure provides a temperature detection method, which can be applied to the antenna module provided in the embodiment I. The process of the method is shown in FIG. 13, and includes the following steps.

S41: the total self-capacitance change of the sensor electrode is acquired; in the step, the total self-capacitance change of the sensor electrode at the current time with respect to the reference time can be acquired.

S42: an ambient temperature change around the sensor electrode is determined according to the total self-capacitance change of the sensor electrode.

Figure 14:
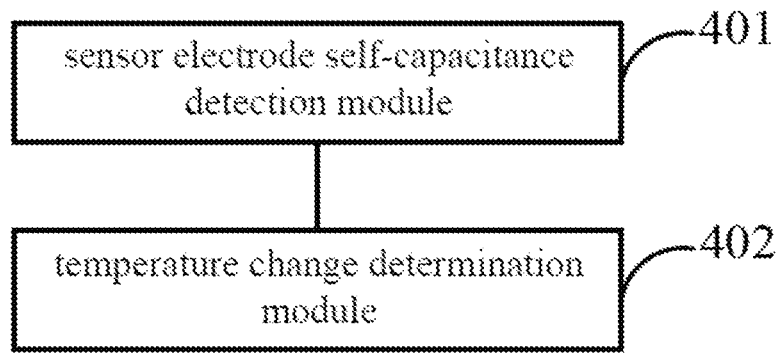
FIG. 14 is a schematic structure diagram illustrating a temperature detection apparatus according to the embodiment V of the present disclosure.

Based on the same inventive concept, the embodiment V of the present disclosure further provides a temperature detection apparatus which can be applied to the antenna module provided in the embodiment I, a structure thereof is shown in FIG. 14 and includes:

a sensor electrode self-capacitance detection module 401, configured to acquire the total self-capacitance change of the sensor electrode;

a temperature change determination module 402, configured to determine an ambient temperature change around the sensor electrode according to the total self-capacitance change of the sensor electrode.

Optionally, the temperature change determination module 402 is specifically configured to determine the ambient temperature change around the sensor electrode according to the corresponding relationship between the self-capacitance change of the sensor electrode and the temperature change, and the total self-capacitance change of the sensor electrode.

Figure 15:
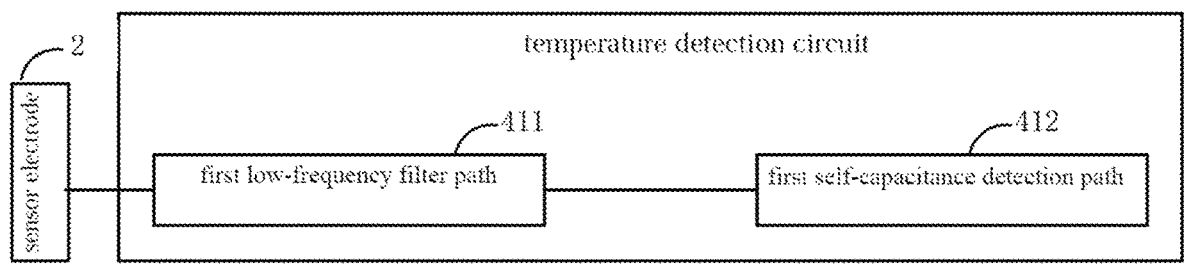
FIG. 15 is a schematic structure diagram illustrating a temperature detection circuit according to the embodiment V of the present disclosure.

Based on the same inventive concept, the embodiment V of the present disclosure further provides a temperature detection circuit, which is applied to the above-mentioned antenna module. The structure of the temperature detection circuit is shown in FIG. 15, and the temperature detection circuit includes a low-frequency filter path 411 and a first self-capacitance detection path 412.

The first low-frequency filter path 411 is connected to the sensor electrode 2 in the antenna module and the first self-capacitance detection path 412, which can block the high-frequency signal and allow the low-frequency signal to pass therethrough.

The first self-capacitance detection path 412 is configured to detect an output voltage of the first low-frequency filter path 411, obtain the total self-capacitance change of the sensor electrode 2, and determine the ambient temperature change around the sensor electrode 2 according to the total self-capacitance change of the sensor electrode 2.

The embodiment V of the present disclosure further provides a temperature detection system including the above-mentioned antenna module and the above-mentioned temperature detection circuit.

With respect to the above-mentioned temperature detection apparatus and system in the above embodiments, the specific manner of operation of each module is described in detail in the embodiment of the method and will not be elaborated here.

With the temperature detection method, apparatus and system provided in the embodiments of the present disclosure, the self-capacitance change caused by the temperature change can be determined by using the self-capacitance change of the sensor electrode 2, to accurately determine the temperature change; the implementation is simple and convenient.

Embodiment VI

Figure 16:
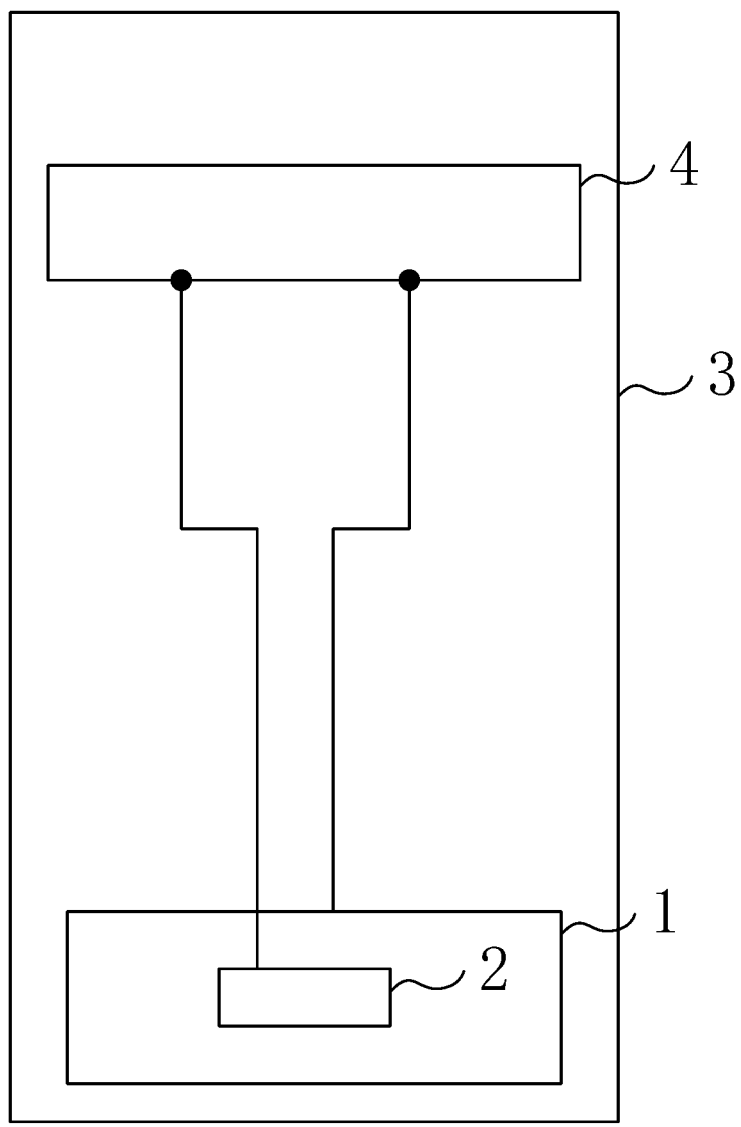
FIG. 16 is a schematic structure diagram illustrating a radio device according to an embodiment VI of the present disclosure.

The embodiment VI of the present disclosure provides a radio device, a structure of which is shown in FIG. 16. The radio device includes a capacitance detection chip 4, the sensor electrode 2 and the antenna 1.

The sensor electrode 2 is located in a region in which the sensor electrode 2 is electromagnetically shielded by the antenna 1 in at least one direction.

The capacitance detection chip 4 is connected to the antenna 1 and is configured to detect the self-capacitance of the antenna 1. The capacitance detection chip 4 is further connected to sensor electrode 2 and is configured to detect the self-capacitance of the sensor electrode 2.

The capacitance detection chip 4 can be connected to the antenna 1 through a wire; and the capacitance detection chip 4 can be connected to the sensor electrode 2 through a wire. The capacitance detection chip 4, the sensor electrode 2, and the antenna 1 can all be provided inside the housing 3 of the radio device.

Figure 17:
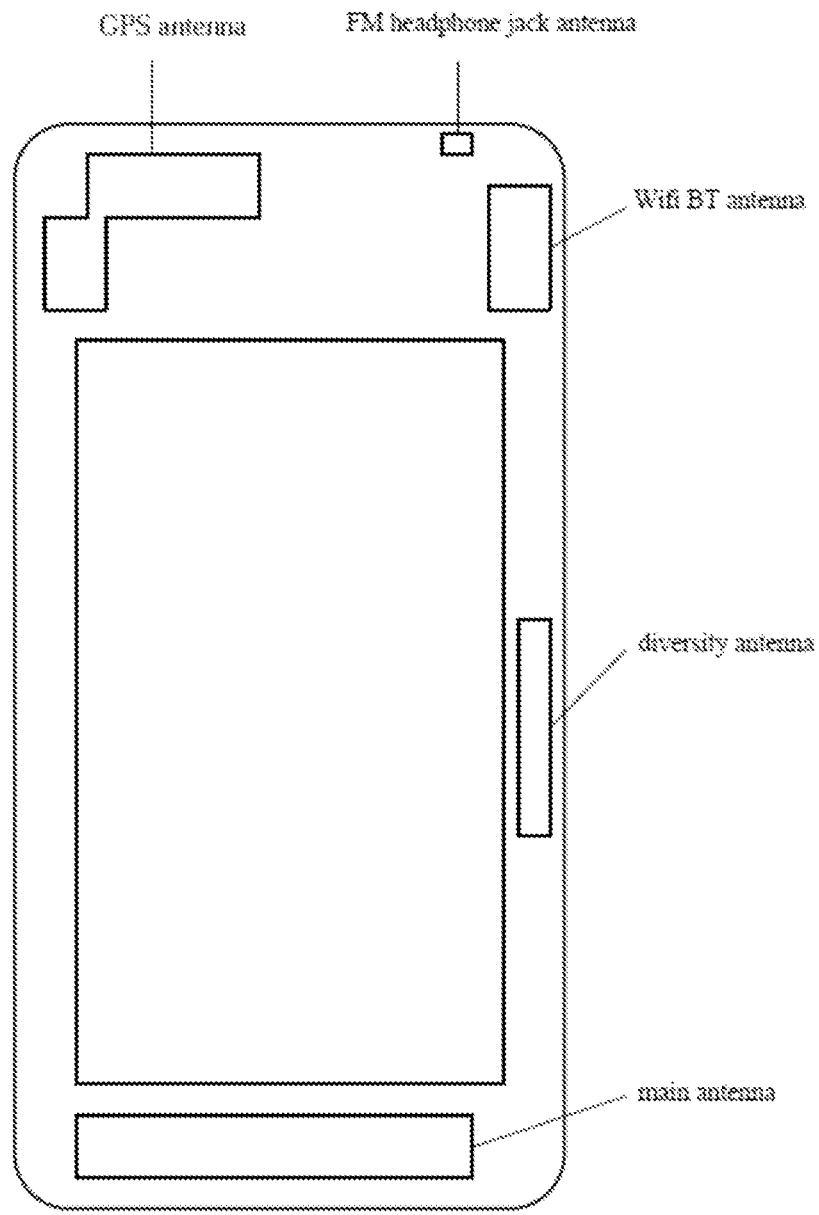
FIG. 17 is a schematic diagram illustrating an antenna arrangement in a mobile terminal according to the embodiment VI of the present disclosure.
Figure 18:
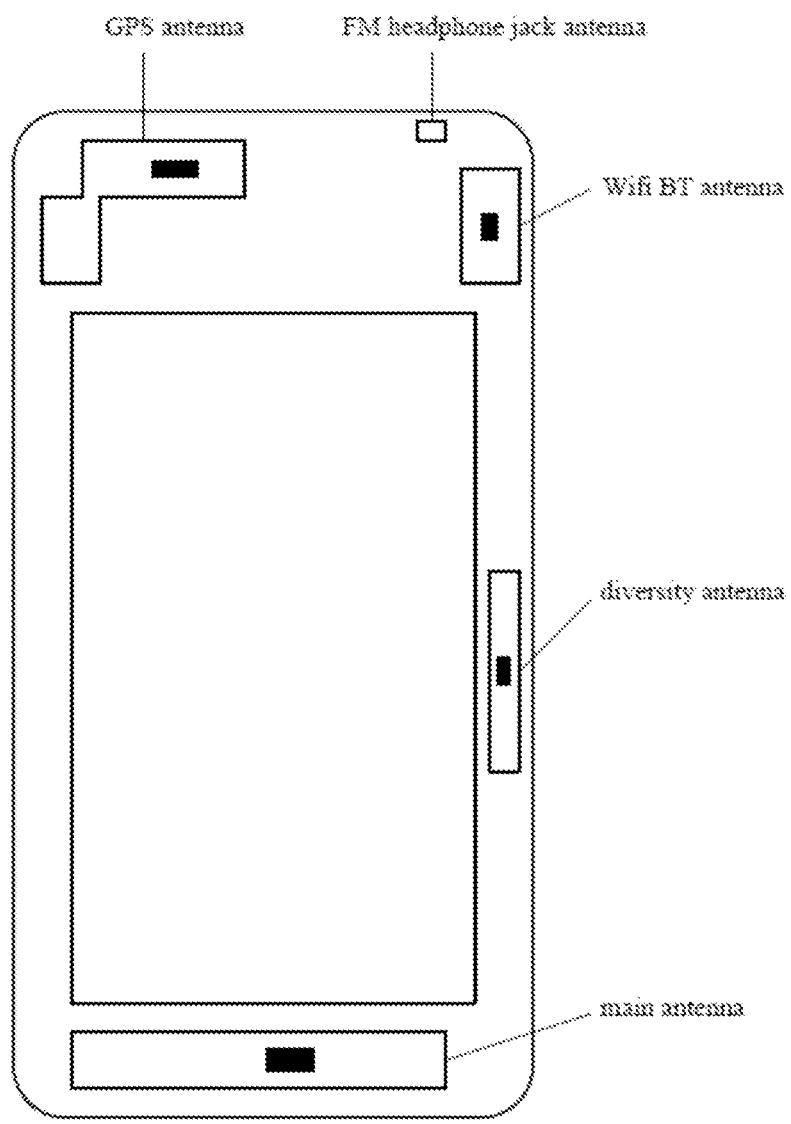
FIG. 18 is a schematic diagram illustrating a mobile terminal with antennas inside which sensor electrodes are provided according to the embodiment VI of the present disclosure.

For example, a mobile terminal is taken as the radio device as an example, referring to FIG. 17, the mobile terminal includes a main antenna, a diversity antenna, a GPS antenna, an FM headphone jack antenna, a Wifi BT antenna, etc. The GPS antenna and the Wifi antenna are located at an upper end of the mobile terminal; the diversity antenna is located at a side of the mobile terminal; and the main antenna is located at a lower end of the mobile terminal. The sensor electrode is provided inside the antenna, as shown in FIG. 18. For example, metal sheets are provided inside the main antenna, the diversity antenna, the GPS antenna and the Wifi BT antenna respectively, such as at positions indicated by black blocks in FIG. 18. The metal sheet can be shielded by the corresponding antenna, and the self-capacitance is not affected when an object is approaching.

Figure 19:
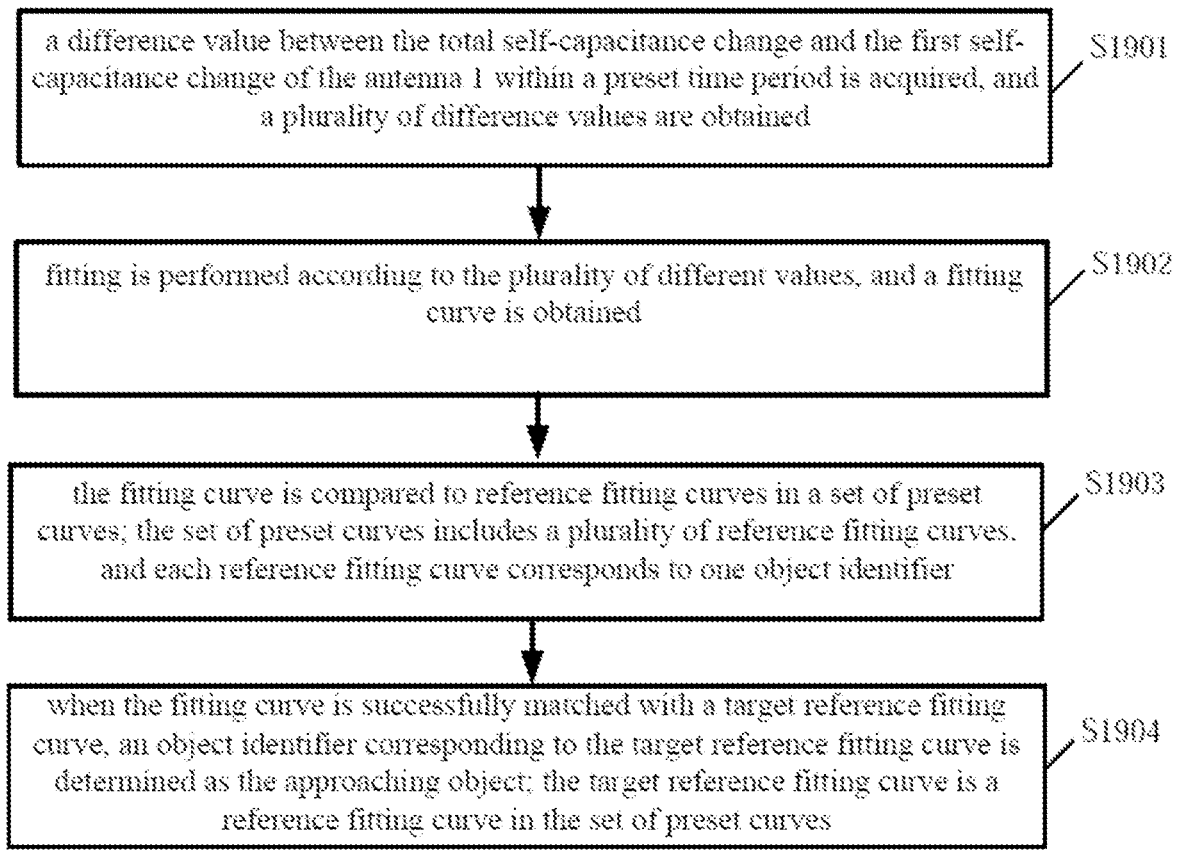
FIG. 19 is a flow chart showing an object proximity detection method according to an embodiment of the present disclosure.

Referring to FIG. 19, which is a flow chart showing an approaching object detection method according to an embodiment of the present disclosure, as shown in the figure, the method can be applied to an electronic device including the above-mentioned antenna module, and is specifically configured to determine whether there is an object approaching the antenna 1 according to the difference value between the total self-capacitance change and the first self-capacitance change of the antenna 1. The approaching object detection method includes the following steps.

S1901: a difference value between the total self-capacitance change and the first self-capacitance change of the antenna 1 within a preset time period is acquired, and a plurality of difference values are obtained.

S1902: fitting is performed according to the plurality of different values, and a fitting curve is obtained.

S1903: the fitting curve is compared to reference fitting curves in a set of preset curves; the set of preset curves includes a plurality of reference fitting curves, and each reference fitting curve corresponds to one object identifier.

S1904: when the fitting curve is successfully matched with a target reference fitting curve, an object identifier corresponding to the target reference fitting curve is determined as the approaching object; the target reference fitting curve is a reference fitting curve in the set of preset curves.

The preset time period can be set in advance or system default. The set of preset curves can be pre-stored in the memory. The set of preset curves may include a plurality of reference fitting curves, and each reference fitting curve corresponds to one object identifier. The object identifier is configured to identify a type of the object. For example, the object identifier may include at lease of people, cat, dog, book, cell phone, wallet, wood, etc., which are not limited here. Of course, people can also be men or women. A horizontal axis of the reference fitting curve represents the time, and a vertical axis represents the difference values.

Specifically, the difference value between the total self-capacitance change and the first self-capacitance change of the antenna 1 in a preset time period can be acquired, and a plurality of difference values are obtained; each difference value corresponds to a time point. Furthermore, a plurality of coordinate points can be constructed based on the plurality of difference values and the plurality of time points, and then the fitting is performed based on the plurality of coordinate points to obtain the fitting curve. Further, the fitting curve can be compared to the reference fitting curves in the set of preset curves. When the fitting curve is successfully matched with the target reference fitting curve, the object identifier corresponding to the target reference fitting curve is determined as the approaching object. In such a manner, not only the proximity detection can be performed, but also the type of the approaching object can be detected.

Optionally, the method may further include the following steps.

A reference distance corresponding to a difference value between the total self-capacitance change and the first self-capacitance change of the antenna 1 at the current time is determined according to a preset mapping relationship between the difference value and a distance.

A target mean square error is determined according to the fitting curve.

A target variation of capacitance reading corresponding to the target mean square error is determined according to a preset mapping relationship between the mean square error and a variation of capacitance reading.

A target approaching distance is determined according to the reference distance and the target variation of capacitance reading.

In the specific implementation, the preset mapping relationship between the difference value and the distance, and the preset mapping relationship between the mean square error and the variation of capacitance reading can be pre-stored. A value of the variation of capacitance reading can be ranged from −0.1 to 0.1. Due to the variation, there exists a certain error in the distance. In addition, the variation of capacitance reading can be utilized to correct the reference distance to improve the accuracy of the distance detection.

Specifically, the reference distance corresponding to the difference value between the total self-capacitance change and the first self-capacitance change of the antenna 1 at the current time can be determined according to the preset mapping relationship between the difference value and the distance; and then sampling is performed according to the fitting curve to obtain a plurality of points, and the target mean square error is determined according to the plurality of points; and then the target variation of capacitance reading corresponding to the target mean square error is determined according to the preset mapping relationship between the mean square error and the variation of capacitance reading; and then the target approaching distance is determined according to the reference distance and the target variation of capacitance reading; specifically, as follows:

target approaching distance=(1+target variation of capacitance reading)*reference distance.

In such a manner, the distance of the approaching object can be accurately detected.

Figure 20:
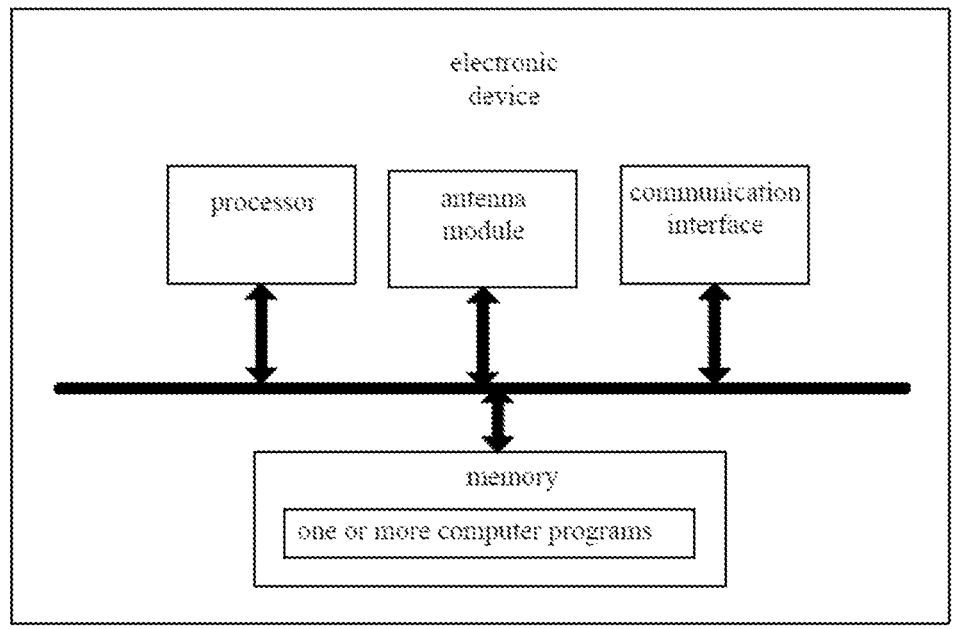
FIG. 20 is a schematic structure diagram illustrating an electronic device according to an embodiment of the present disclosure.

In accordance with the above embodiments, referring to FIG. 20, which is a schematic structure diagram of an electronic device according to an embodiment of the present disclosure, as shown in the figure, the electronic device includes a processor, a memory, a communication interface and one or more computer programs applied to the electronic device. One or more computer programs are stored in the memory and configured to be executed by the processor. In the embodiment, the above computer programs are executed by the processor to perform the following steps.

A difference value between the total self-capacitance change and the first self-capacitance change of the antenna 1 within a preset time period is acquired, and a plurality of difference values are obtained.

Fitting is performed according to the plurality of different values, and a fitting curve is obtained.

The fitting curve is compared to reference fitting curves in a set of preset curves; the set of preset curves includes a plurality of reference fitting curves, and each reference fitting curve corresponds to one object identifier.

When the fitting curve is successfully matched with a target reference fitting curve, an object identifier corresponding to the target reference fitting curve is determined as the approaching object; the target reference fitting curve is a reference fitting curve in the set of preset curves.

Optionally, the computer programs are executed by the processor to further perform the following steps:

a reference distance corresponding to a difference value between the total self-capacitance change and the first self-capacitance change of the antenna 1 at the current time is determined according to a preset mapping relationship between the difference value and a distance;

a target mean square error is determined according to the fitting curve;

a target variation of capacitance reading corresponding to the target mean square error is determined according to a preset mapping relationship between the mean square error and a variation of capacitance reading; and a target approaching distance is determined according to the reference distance and the target variation of capacitance reading.

Figure 21:
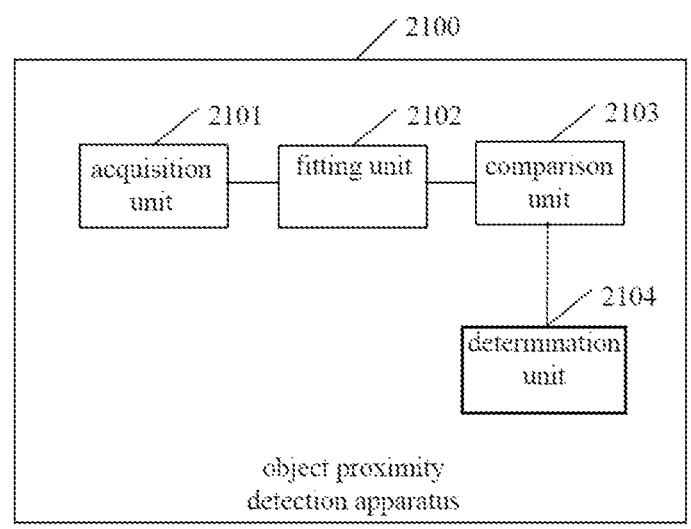
FIG. 21 is a schematic structure diagram illustrating an object proximity detection apparatus according to an embodiment of the present disclosure.

FIG. 21 is a block diagram consisting of functional units of an object proximity detection apparatus 2100 according to an embodiment of the present disclosure. The object proximity detection apparatus 2100 is applied to the electronic device. The apparatus 2100 includes: an acquisition unit 2101, a fitting unit 2102, a comparison unit 2103, and a determination unit 2104.

The acquisition unit 2101 is configured to acquire a difference value between the total self-capacitance change and the first self-capacitance change of the antenna 1 within a preset time period, and obtain a plurality of difference values.

The fitting unit 2102 is configured to perform fitting according to the plurality of different values, and obtain a fitting curve.

The comparison unit 2103 is configured to compare the fitting curve to reference fitting curves in a set of preset curves; in which the set of preset curves includes a plurality of reference fitting curves, and each reference fitting curve corresponds to one object identifier.

The determination unit 2104 is configured to, when the fitting curve is successfully matched with a target reference fitting curve, determine an object identifier corresponding to the target reference fitting curve as the approaching object; in which the target reference fitting curve is a reference fitting curve in the set of preset curves.

Optionally, the apparatus 2100 is further configured to: determine a reference distance corresponding to a difference value between the total self-capacitance change and the first self-capacitance change of the antenna 1 at the current time according to a preset mapping relationship between the difference value and a distance; determine a target mean square error according to the fitting curve; determine a target variation of capacitance reading corresponding to the target mean square error according to a preset mapping relationship between the mean square error and a variation of capacitance reading; and determine a target approaching distance according to the reference distance and the target variation of capacitance reading.

It should be appreciated that the function of each program module of the detection apparatus in the embodiment can be implemented according to the method in the above embodiments, and as for the specific implementation process, reference can be made to the relevant description in the above embodiments, which will not be repeated here.

An embodiment of the present disclosure further provides a chip capable of operating at least one of the above-mentioned antenna self-capacitance change detection method, the above-mentioned proximity detection method, and the above-mentioned antenna transmitting power control method.

The present disclosure further provides a computer storage medium, on which computer executable instructions are stored. When the computer executable instructions are executed by a processor, at least one of the above-mentioned antenna self-capacitance change detection method, the above-mentioned proximity detection method, the above-mentioned object proximity detection method, and the above-mentioned antenna transmitting power control method is implemented.

With respect to the apparatus, device and chip in the above embodiments, the specific manner of operation of each module is described in detail in the embodiments of the method and will not be elaborated here.

With the antenna module provided in the above embodiments, and the self-capacitance change detection method, object proximity detection method, antenna transmitting power control method and other related applications applied to the antenna module, the problem that accuracy of the capacitance proximity detection process of the radio device is reduced due to the temperature change can be effectively solved.

The advantages of the above technical solution provided by the embodiments of the present disclosure include at least:

The antenna module provided in the present disclosure is provided with a sensor electrode in the region where the antenna module can be electromagnetically shielded by the antenna in at least one direction. Since the sensor electrode is adjacent to the antenna, the effects of ambient temperature change on them are substantially the same. Accordingly, the antenna self-capacitance change caused by the temperature change can be eliminated by means of the sensor electrode and the difference between self-capacitance changes of the antenna; the antenna self-capacitance change caused by the proximity of the object can be accurately obtained, to accurately determine whether there is an object approaching.

With the antenna self-capacitance change detection method and the proximity detection method provided in the embodiments of the present disclosure, the antenna self-capacitance change caused by the temperature change can be determined by using the self-capacitance change of sensor electrode; and the antenna self-capacitance change caused by the temperature change is subtracted from the total antenna self-capacitance change, so that the antenna self-capacitance change caused by the proximity of the object can be accurately obtained, to accurately determine whether there is an object approaching.

With the antenna transmitting power control method provided in the present disclosure, the antenna self-capacitance change caused by the temperature change can be determined by using the self-capacitance change of the sensor electrode; and the antenna self-capacitance change caused by the temperature change is subtracted from the total antenna self-capacitance change, the antenna self-capacitance change caused by the proximity of the object can be accurately obtained, to accurately determine whether there is an object approaching, in order to better control the transmission power of the antenna, reduce the impact of the electromagnetic radiation on the human body, such that the radio device can conform to the SAR standard.

Unless otherwise specified, terms such as processing, calculation, operation, determination, displaying, etc., may refer to the actions and/or processes of one or more processor or computing systems, or similar devices; the actions and/or processes are represented as data operations of physical (e.g. electronic) quantities in the registers or memory of the processing system, and transformed into other data of the physical quantities in the memory, registers or other such information storage, emitter or display device of the processing system. Information and signals can be represented by using any of a number of different techniques and methods. For example, data, instructions, commands, information, signals, bits, symbols, and chips referred to throughout the description above may be represented in terms of voltages, currents, electromagnetic waves, magnetic fields or particles, optical fields or particles, or any combination thereof.

It should be understood that a particular sequence or hierarchy of steps in the disclosed process is an exemplary method. Based on design preferences, it should be appreciated that a particular sequence or hierarchy of steps in the process can be rearranged without departing from the protection scope of the disclosure. The attached method claims provide elements of the various steps in an exemplary order and are not intended to limit the specific order or hierarchy described.

In the detailed description above, the various features are combined together in an embodiment to simplify this exposure. Such disclosure manner should not be regarded as reflecting the intention that the implementation of the subject matter claimed for protection needs to clearly have more features than the features stated in each claim. Rather, as reflected in the attached claims, the present disclosure is in a state of being less than the full features of the individual embodiment disclosed. Accordingly, the attached claims are hereby expressly incorporated into the detailed description, each claim serves as a separate alternative implementation of the present disclosure.

A person skilled in the art should also understand that the various illustrative logic boxes, modules, circuits, and algorithmic steps described in conjunction with the embodiments of this article can be implemented into electronic hardware, computer software, or a combination thereof. In order to clearly illustrate the interchangeability between hardware and software, the various declarative components, boxes, modules, circuits, and steps are generally described around their functions. Whether this function is implemented in hardware or software depends on the particular application and the design constraints imposed on the whole system. A skilled technician may implement the described function in a flexible manner for each particular application, but such implementation decisions should not be interpreted as a departure from the scope of protection of the present disclosure.

The steps in the method or algorithm described in conjunction with the embodiments of the disclosure may be directly represented as hardware, software modules executed by the processor, or a combination thereof. Software modules may be located in RAM memory, flash memory, ROM memory, EPROM memory, EEPROM memory, register, hard disk, removable disk, CD-ROM, or any other form of storage medium known in the art. An exemplary storage medium is connected to a processor, so that the processor can read information from and write information to the storage medium. Of course, the storage medium can also be a component of the processor. The processor and storage medium may be located in ASIC. The ASIC can be located in a user terminal. Of course, the processor and storage medium can also exist as discrete components in the user terminal.

For software implementation, the technologies described in the disclosure can be implemented by modules (e.g., procedures, functions, etc.) that perform the functions described in the disclosure. The software code can be stored in a memory unit and executed by the processor. The memory unit may be implemented in or out of the processor, in the latter case it is coupled to the processor by means of communication, which is common knowledge in the art.

The description above includes examples of one or more embodiments. It is, of course, impossible to describe all possible combinations of parts or methods in order to describe the above embodiments, but the general skilled person in the field should be aware that further combinations and arrangements of the various embodiments can be made. Therefore, the embodiments described herein are intended to cover all such variations, modifications and deformations falling within the protection scope of the attached claims. In addition, as used in the specification or claim, the term "comprise" is covered in a manner similar to the term "include", just as "include" is explained as a cohesive word in the claim. In addition, the term "or" used in the claims and specification is intended to mean "non-exclusive or".

What is claimed is:

1. An antenna module, comprising:
   an antenna configured to generate a self-capacitance change based on an approaching object and a temperature change; and
   at least one sensor electrode configured to generate a self-capacitance change based on the temperature change;
   wherein the at least one sensor electrode is configured to locate in a region in which the at least one sensor electrode is electromagnetically shielded by the antenna in at least one direction, such that no electromagnetic field is formed between the at least one sensor electrode and the approaching object in the at least one direction when a voltage difference between the antenna and the at least one sensor electrode remains constant.

2. The antenna module according to claim 1, wherein the at least one sensor electrode comprises at least one of a metal sheet, a metal wire, a conductive non-metallic sheet, or a conductive non-metallic wire.

3. The antenna module according to claim 1, wherein the antenna and the at least one sensor electrode are configured to locate in the same temperature environment.

4. A proximity detection system comprising the antenna module of claim 1 and a detection circuit, wherein the detection circuit is configured to:
   detect a total self-capacitance change of the at least one electrode;
   detect a total self-capacitance change of the antenna; and
   determine a self-capacitance change of the antenna caused by proximity of an object based on the total self-capacitance change of the at least one electrode and the total self-capacitance change of the antenna.

5. The proximity detection system according to claim 4, wherein the detection circuit is further configured to determine whether there is an object approaching based on the self-capacitance change of the antenna caused by the proximity of the object.

6. The proximity detection system according to claim 4, wherein the detection circuit is configured to determine a self-capacitance change of the antenna caused by a temperature change according to the total self-capacitance change of the at least one sensor electrode and a preset self-capacitance change proportional coefficient, and determine the self-capacitance change of the antenna caused by the proximity of the object based on the self-capacitance change of the antenna caused by the temperature change and the total self-capacitance change of the antenna.

7. The proximity detection system according to claim 6, wherein the preset self-capacitance change proportional coefficient is determined according to an area of the antenna.

8. The proximity detection system according to claim 4, wherein the detection circuit comprises:
   a sensor electrode self-capacitance detection circuit configured to detect the total self-capacitance change of the at least one sensor electrode, and comprising a first low-frequency filter path and a first self-capacitance detection path, the first low-frequency filter path being configured to connect the at least one electrode and the first self-capacitance detection path to block a high-frequency signal and allow a low-frequency signal to pass therethrough, the first self-capacitance detection circuit being configured to detect an output voltage of the first low-frequency filter path, to obtain the total self-capacitance change of the at least one electrode; and
   an antenna self-capacitance detection circuit configured to detect the total self-capacitance change of the antenna, and comprising a second low-frequency filter path, a high-frequency filter path, and a second self-capacitance detection path, the second low-frequency filter path being configured to connect the antenna and the second self-capacitance detection path to block the high-frequency signal and allow the low-frequency signal to pass therethrough, the high-frequency filter path being configured to connect the antenna and a RF transceiver unit to block the low-frequency signal and allow the high-frequency signal to pass therethrough, the second self-capacitance detection circuit is configured to detect an output voltage of the second low-frequency filter path, to obtain the total self-capacitance change of the antenna.

9. The proximity detection system according to claim 4, wherein the detection circuit is configured to:
   acquire a plurality of difference values between the total self-capacitance change and the first self-capacitance change of the antenna at a plurality of times within a preset time period;
   perform fitting according to the plurality of different values, and obtain a fitting curve; and compare the fitting curve to a plurality of preset reference fitting curves, each reference fitting curve corresponding to one object identifier, and determine an object identifier corresponding to a matched reference fitting curve as the approaching object when the fitting curve matches one of the reference fitting curves.

10. The proximity detection system according to claim 9, wherein the detection circuit is further configured to:
determine a reference distance corresponding to a difference value between the total self-capacitance change and the first self-capacitance change of the antenna at a current time according to a preset mapping relationship between the difference value and a distance;
determine a target mean square error according to the fitting curve;
determine a target variation of capacitance reading corresponding to the target mean square error according to a preset mapping relationship between the mean square error and a variation of capacitance reading; and
determine a target approaching distance according to the reference distance and the target variation of capacitance reading.

11. An antenna transmitting power control system comprising the proximity detection system of claim 4, wherein the detection circuit is configured to adjust a transmitting power of the antenna according to a preset rule when an object is detected to approach the antenna.

12. A radio device comprising the proximity detection system of claim 4, and comprising a housing, the antenna module being located inside the housing and the at least one electrode being located inside the antenna.

13. An antenna self-capacitance change detection method for an antenna module including an antenna and a sensor electrode, the sensor electrode being configured to be electromagnetically shielded by the antenna in at least one direction such that no electromagnetic field is formed between the sensor electrode and the approaching object in the at least one direction, the antenna self-capacitance change detection method comprising:
acquiring a total self-capacitance change of the antenna and a total self-capacitance change of the sensor electrode respectively;
determining a first self-capacitance change of the antenna caused by a temperature change according to the total self-capacitance change of the sensor electrode and a preset self-capacitance change proportional coefficient; and
determining a difference value between the total self-capacitance change and the first self-capacitance change of the antenna as a second self-capacitance change of the antenna caused by proximity of an object.

14. The antenna self-capacitance change detection method according to claim 13, wherein the preset self-capacitance change proportional coefficient is determined according to an area of the antenna and an area of the sensor electrode, and the first self-capacitance change of the antenna caused by the temperature change is equal to the product of the total self-capacitance change of the sensor electrode and the preset self-capacitance change proportional coefficient.

15. The antenna self-capacitance change detection method according to claim 13, further comprising: determining whether there is an object approaching the antenna based on the second self-capacitance change.

16. The antenna self-capacitance change detection method according to claim 13, wherein:
the acquiring the total self-capacitance change of the antenna and the total self-capacitance change of the sensor electrode respectively comprises: acquiring total self-capacitance changes of the antenna and total self-capacitance changes the sensor electrode at a plurality of times;
the determining the first self-capacitance change of the antenna caused by the temperature change according to the total self-capacitance change of the sensor electrode and the preset self-capacitance change proportional coefficient comprises: determining a plurality of first self-capacitance changes of the antenna caused by the temperature change at a plurality of times according to a plurality of total self-capacitance changes of the sensor electrode and the preset self-capacitance change proportional coefficient;
the determining the difference value between the total self-capacitance change and the first self-capacitance change of the antenna as the second self-capacitance change of the antenna caused by the proximity of the object comprises: determining a plurality of difference values at a plurality of times; and
the method further comprises:
performing fitting according to the plurality of different values, and obtaining a fitting curve; and
comparing the fitting curve to a plurality of preset reference fitting curves, each reference fitting curve corresponding to one object identifier, and determining an object identifier corresponding to a matched reference fitting curve as the approaching object when the fitting curve matches one of the reference fitting curves.

17. The antenna self-capacitance change detection method according to claim 16, further comprising:
determining a reference distance corresponding to a difference value between the total self-capacitance change and the first self-capacitance change of the antenna at a current time according to a preset mapping relationship between the difference value and a distance;
determining a target mean square error according to the fitting curve;
determining a target variation of capacitance reading corresponding to the target mean square error according to a preset mapping relationship between the mean square error and a variation of capacitance reading; and
determining a target approaching distance according to the reference distance and the target variation of capacitance reading.

18. The antenna self-capacitance change detection method according to claim 13, wherein the antenna and the sensor electrode are configured to locate at the same ambient temperature.

19. An antenna transmitting power control method, comprising the antenna self-capacitance change detection method of claim 13, wherein when an object is detected to approach the antenna, the antenna transmitting power is adjusted according to a preset rule.

20. A computer storage medium, on which computer executable instructions are stored, wherein when the computer executable instructions are executed by a processor, the antenna self-capacitance change detection method of claim 13 is implemented.

* * * * *